United States Patent [19]
Sutton

[11] Patent Number: 5,819,645
[45] Date of Patent: Oct. 13, 1998

[54] BALER FEED GATE SAFETY SEQUENCING CIRCUIT

[75] Inventor: Gregory B. Sutton, Jacksonville, Fla.

[73] Assignee: Load King Manufacturing Co., Inc., Jacksonville, Fla.

[21] Appl. No.: 933,230

[22] Filed: Sep. 18, 1997

Related U.S. Application Data

[60] Provisional application No. 60/035,173 Jan. 9, 1997.

[51] Int. Cl.[6] .............................. B30B 9/30; B30B 15/16
[52] U.S. Cl. .................. 100/53; 100/229 A; 200/61.62; 200/61.71; 361/114
[58] Field of Search .......................... 100/45, 53, 229 A, 100/255; 200/61.62, 61.71; 361/114

[56] References Cited

U.S. PATENT DOCUMENTS

| | | |
|---|---|---|
| 3,886,407 | 5/1975 | Anderson ................................ 361/114 |
| 4,039,060 | 8/1977 | Williams et al. ......................... 100/53 |
| 4,179,987 | 12/1979 | Dohm, Jr. ................................ 100/53 |
| 4,395,641 | 7/1983 | Dise ........................................ 100/53 |
| 4,451,865 | 5/1984 | Warner et al. ........................... 361/114 |
| 5,044,271 | 9/1991 | Robbins et al. .......................... 100/53 |

*Primary Examiner*—Stephen F. Gerrity
*Attorney, Agent, or Firm*—Thomas C. Saitta

[57] ABSTRACT

A baler feed gate safety sequencing circuit which prevents successive operation of a compactor baler with the feed gate in the open position. The circuit requires the raising and lowering of the feed gate after each compaction cycle for operation of the baler ram, even if the gate limiting switch is rigged to provide an indication that the feed gate is closed when in reality it is open.

4 Claims, 7 Drawing Sheets

BALER FEED GATE SAFETY SEQUENCING CIRCUIT

This application claims the benefit of U.S. Provisional Application No. 60/035,173, filed Jan. 9, 1997.

BACKGROUND OF THE INVENTION

The invention relates generally to the field of safety switches or circuitry used in baler machines of the type used to crush waste material such as cardboard. More particularly, the invention relates to devices which prevent operation of the compaction ram unless the safety feed gate blocking the loading chamber and the area beneath the compaction ram is closed.

Vertical compaction balers are used to compact relatively large amounts of individual waste material into a dense, small volume configuration which can be more easily handled and transported. A common use for such balers is in a commercial site which must dispose of large quantities of cardboard boxes. The operators load individual boxes into the loading chamber, where they fall into the bale chamber. When the baler chamber approaches maximum capacity, the operator closes a feed gate to block access to the loading chamber. A high pressure compaction ram then descends through the loading chamber onto the loose cardboard boxes and presses them into a compact mass in the bottom of the bale chamber. The ram then retracts past and above the loading chamber and the feed gate is opened. More boxes may now be loaded and compacted, and the cycle is repeated until the bale size limit is obtained. The compacted bale is then removed from the baler and the operation starts over.

Vertical balers have safety switches installed in their circuitry which are designed to prevent operation of the compaction ram if the feed gate is not in the closed position. This is a safety feature to prevent accidental injury to the operator. This safety gate switch is typically a mechanical limit switch, an optical switch, an inductive switch, a proximity switch, or any other known type of switch capable of sensing the position of the gate and controlling power to the compaction ram. Since creating a complete bale of compacted material requires cycling the compaction ram a relatively large number of times, which in turn requires that the operator open and close the safety feed gate for each cycle, it is common practice for the operators to override the safety gate switch by tying back a mechanical switch or by placing objects in the sensing path of an optical, inductive or proximity switch, so that the feed gate can be left open continuously between compaction cycles. The gate switch is fooled into sensing that the feed gate is in the closed position even though it is in the open position and will allow current to reach the compaction ram even if the feed gate is not closed, thus creating a dangerous situation as the load chamber is not sealed off as the ram descends to crush the waste material.

It is an object of this invention to provide a baler feed gate safety sequencing circuit which precludes operation of the compacting ram unless the feed gate sealing off the loading chamber is in the closed position, wherein the circuit requires that the feed gate be opened and then closed after each compaction cycle in order for power to be delivered to the compaction ram for the next compaction cycle, thus making it a wasted exercise for an operator to deceive the circuit by leaving the feed gate open and utilizing means to provide a false signal to the circuit that the feed gate is in the closed position so that the ram will descend, since the feed gate would have to be closed and opened after each cycle even if this deception is performed. This object is met by providing circuitry which recognizes whether the safety gate switch has cycled from a first condition to a second condition and back to the first condition after completion of the compaction cycle, where power is precluded from operating the ram unless the gate switch has fully cycled. It is a further object to provide such a circuit which can be retrofitted to existing balers or built into new units.

SUMMARY OF THE INVENTION

The invention is an electrical safety circuit which is incorporated into a standard vertical baler operational circuit of the type which actuates the ram cycle responsive to the sensed condition of the feed gate and the previous sequence of lift gate operations. The circuitry of the invention precludes operation of the ram or press head if the feed gate is in the open position and, most importantly, precludes operation of the ram after the ram has cycled unless the gate limiting or safety switch has been cycled through a sequence equivalent to shifting the feed gate from one position to another. The circuitry of the invention makes it useless for an operator to override the standard gate switch safety mechanism which controls power to the ram based on the sensed gate position, i.e., power is only supplied to the ram if the standard safety mechanism senses the gate to be in the closed position. Such standard safety mechanisms, typically a limit switch, optical switch, inductive switch, or proximity switch, can be fooled by placement of objects in the sensing region or by blocking or tying open the switch, whereby the safety mechanism falsely senses that the feed gate is in the closed position and allows operation of the ram even though the feed gate is in the open position.

The circuitry of the invention requires a sequence of events to occur during and after the ram has cycled through the compression and retraction stroke, such that the ram will not operate again even if the baler gate sensing switch is improperly rigged to send the signal that the gate is in the closed condition. The circuitry comprises in general means to sense the position of the safety feed gate relative to the loading chamber, i.e., whether the feed gate is in the closed or open position, means to sense completion of a ram compaction cycle where the compaction ram has returned to the retracted position, and means to recognize a sequence of condition changes in the means to sense the position of the safety feed gate and to allow delivery power to the compaction ram only if such sequence has occurred. When the compaction cycle is completed and the ram is retracted above the loading chamber, the circuit must sense both that the feed gate is in the closed position and that the gate switch has been cycled from a first condition to a second condition and back to a first condition after completion of the ram cycle. In this manner, it is a wasted exercise to rig the baler such that the means to sense the position of the feed gate falsely registers that the feed gate is in the closed position even if the feed gate is left continuously in the open position during the compaction cycle, since power will not be delivered to the compaction ram after an initial compaction cycle until the gate switch is sequenced from its first condition indicating a closed gate to its second condition indicating an open gate and back to its first condition indicating a closed gate. Thus the operator is forced to open and close the feed gate once for each compaction cycle, meaning that overriding the safety system does not reduce the number of steps which must be undertaken with each compaction cycle. Because there is no advantage to overriding the system, the operator will use the baler in the proper and intended manner to maximize safety.

The circuitry of the invention recognizes a correct sequence of gate switch condition changes, the circuitry in a retrofit situation containing a sequencing switch which has at least one set of normally closed contacts, an additional relay which is at least a single pole/double throw type, and a sequencing relay which is at least a double pole/double throw type which are arranged to preclude operation of the ram motor if the correct sequence of events has not occurred. In an embodiment where the circuitry is installed at time of manufacture, the circuitry of the invention contains a gate switch which has at least three sets of contact points, with one set being in the normally closed position, a relay which is at least a three pole/double throw type, and a sequencing relay which is at least a double pole/double throw type, which are arranged in such a manner to preclude operation of the ram motor if the gate limit switch is rigged to falsely indicate that the feed gate has been closed.

After a ram cycle has been completed, the raising of the lift gate to the open position to allow insertion of material to be compacted closes the normally closed contacts on the gate limiting switch and energizes the sequencing relay. Lowering the gate opens the normally closed contacts on the gate limiting switch and closes the normally open contacts, such that the path to neutral through the sequencing relay is latched open, which completes the path from the start to the motor. Pressing the start button gives power to the motor and the ram descends to the point of maximum pressure, at which point a pressure switch energizes a second relay to open its normally closed contacts. As the ram ascends, the up stop switch opens to halt power to the motor, which de-energizes the second relay to close its normally closed contacts. If the gate limiting switch has been improperly rigged, there will be no electrical pathway through the sequencing relay to neutral unless and until the gate switch is freed so it can cycle, the gate is lowered and then opened, thus defeating the purpose of rigging the gate limiting switch to get the baler to operate with the feed gate always open.

DETAILED DESCRIPTION OF THE INVENTION

Figure 1:
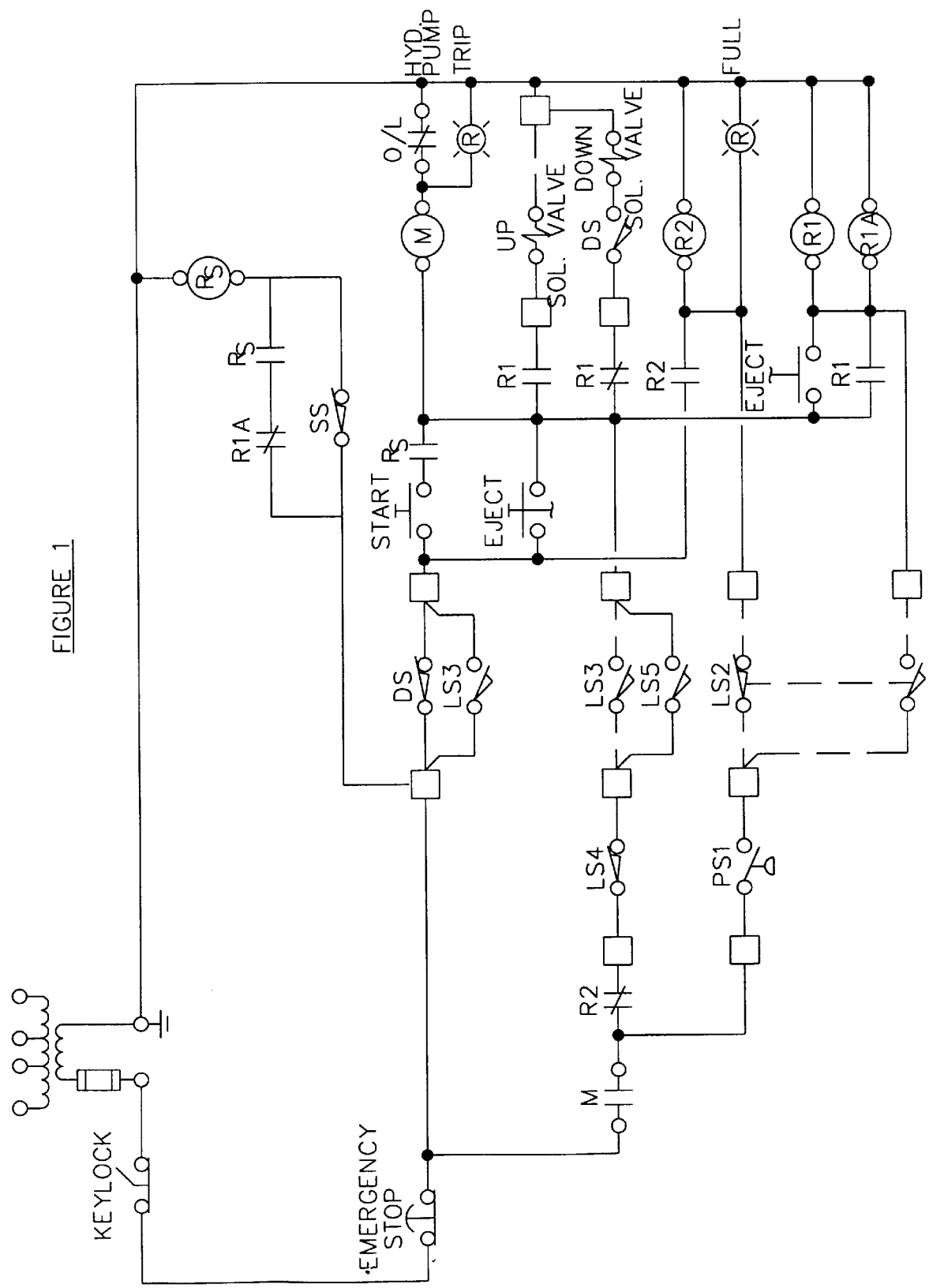
FIG. 1 is a schematic of the invention as incorporated in a typical vertical baler operational circuit as an add-on or retrofit feature.

A baler or compactor is a well known apparatus used to crush waste materials such as cardboard boxes into a compact mass which can then be strapped for easy handling, transport and disposal. The baler comprises a bale chamber to receive the materials which is fronted by a chamber door which remains closed until the bale is to be removed. The loading chamber into which the materials are inserted is covered by a movable feed gate which is required to be closed when the compaction step is underway, thereby blocking the loading chamber area beneath the descending compaction ram. This is for safety reasons to prevent accidental injury to the operator. A ram or press head operated by a motor passes through the loading chamber and into the bale chamber to compact the material and then retracts beyond the loading chamber to complete the compaction cycle. A pressure switch stops downward movement of the ram when the waste material is sufficiently compacted and an up stop switch halts the ascension of the ram at the proper point. A gate limit or safety switch prevents operation of the motor and ram when the feed gate is open. Because there are many individual loading instances of waste material before the capacity of the baler is reached, the operators must open and close the feed gate many times. It is a common practice, extremely hazardous and not authorized by the baler manufacturers, insurers and baler owners, for the operators to rig or defeat the gate limit switch of standard balers such that it falsely senses that the feed gate is in the closed position, thereby allowing the ram to be activated even though in reality the feed gate is still open. The circuitry of the invention makes this unauthorized act of rigging the feed gate limiting switch a wasted exercise, since the circuit requires that the gate limiting switch be cycled from the gate closed condition through the gate open condition and back to the gate closed condition for subsequent operation of the baler compaction ram after each compaction cycle.

In general the invention comprises a circuit having means to sense the position of the safety feed gate relative to the loading chamber, i.e., whether the feed gate is closed or open, such as a gate limit or safety switch, means to sense completion of a compaction cycle, i.e., that the ram has descended and retracted into the ready position, and means to recognize a sequence of condition changes in the gate limit or safety switch and to prevent delivery of power to allow operation of the compaction ram unless this sequence has occurred after the compaction cycle has occurred. All of these means comprise electrical devices including switches and relays which are connected in a communicating manner in an electrical circuit, as shown in the figures, such that the electrical circuit controls the operation of the baler. The means to sense the position of the feed gate may comprise any of the commonly known and used electrical switches capable of preventing passage of electrical current unless a desired circumstance is present. Such switches may include mechanical limit switches, inductive switches, optical switches, proximity switches or the like. The switches are operationally connected to the power circuit such that electrical power is not delivered to operate the compaction ram unless the feed gate is sensed to be in the closed position. The means to sense completion of the compaction cycle and the means to recognize the sequencing of the gate switch are comprised of various electrical components connected in circuit, such as a combination of relays and switches as set out in the figures and below.

The gate limit switch has a first condition which corresponds to the feed gate being in the closed position and a second condition which corresponds to the feed gate being in the open position. The means to recognize a sequence of condition changes in the gate limit or safety switch and to prevent delivery of power to allow operation of the compaction ram unless this sequence has occurred after the compaction cycle has been completed recognizes that the gate limit switch has sequenced from the first condition indicating a closed gate through the second condition indicating an open gate (and where no power is allowed to operate the compaction ram) back to the first condition indicating a closed gate (where power is allowed to operate the compaction ram). The means to recognize a sequence of condition changes in the gate limit switch may require an added sequential switch for a retrofit situation or the gate limit switch itself may be provided with a sufficient number of contacts for proper operation of the recognition circuitry.

Should the operator rig the or deceive the gate limit switch to falsely sense that the feed gate is in the closed position in order to preclude having to raise and lower the feed gate after each compaction cycle, the circuitry will preclude operation of the compaction ram after an initial cycle. To get the baler to operate again after this cycle, the operator would have to free the gate limit switch so that it changes from the first condition indicating the closed gate to the second condition indicating the open gate, then either lower the feed gate or rig the gate limit switch again to change it from the second condition back to the first condition indicating that the feed gate is properly closed. Since this operation takes more time and effort than following the correct procedure of closing the feed gate during the compaction cycle, opening it to load the baler and closing it again to run another compaction cycle, the operator will have little inducement to avoid the safety mechanisms built into the baler. In addition, placement of the gate limit switch at a location of difficult accessibility will further reduce the likelihood that an operator will attempt to override the safety mechanisms.

Figure 2:
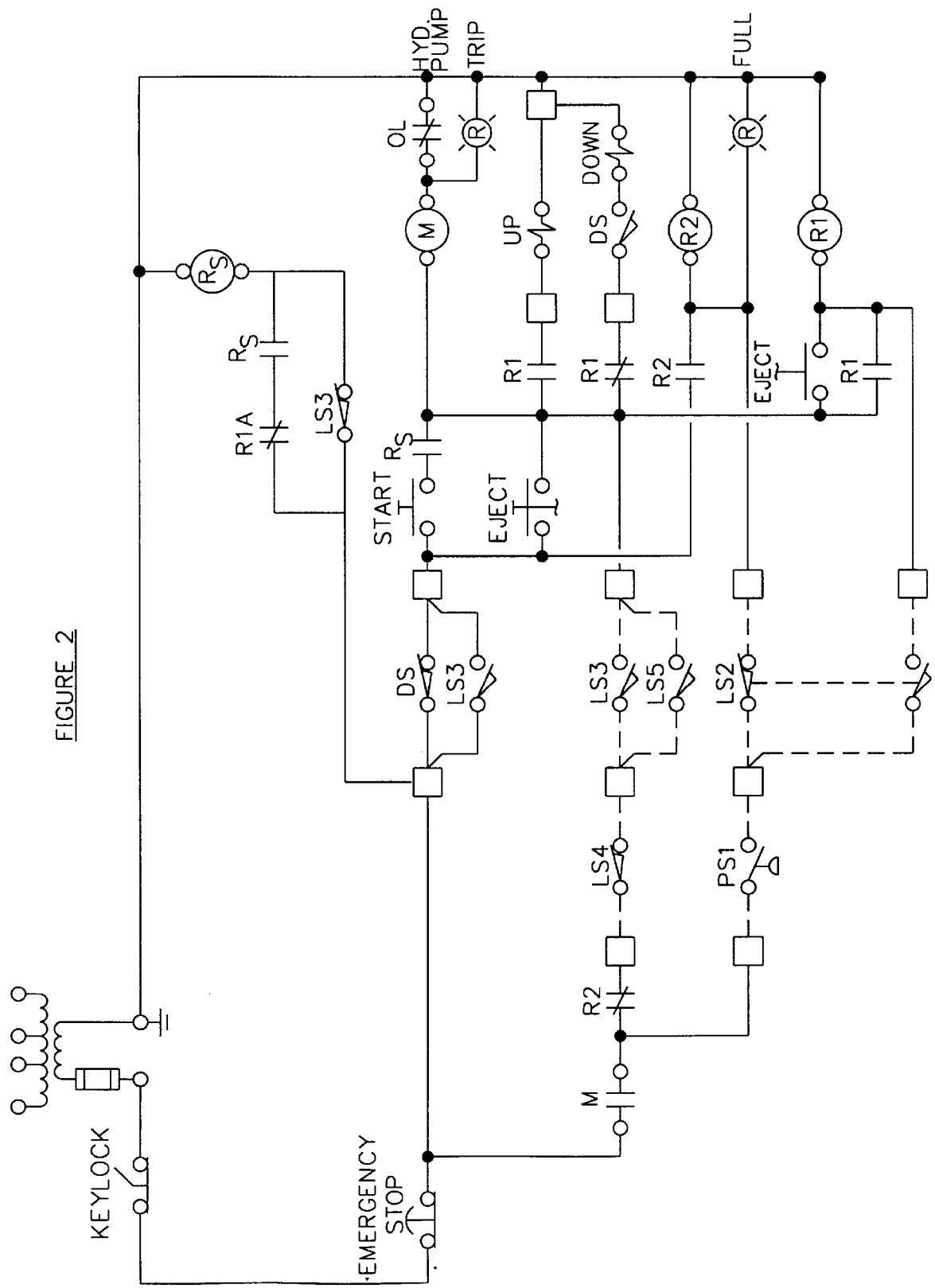
FIG. 2 is a schematic of the invention as incorporated in a typical vertical baler operational circuit.

The baler feed gate safety sequencing circuit for a typical baler circuit which has been retrofitted to function according to the invention is shown schematically in FIG. 1, where $R_s$ represents a sequencing relay, R1 represents a second relay, R2 a third relay, LS3 the gate limiting switch, LS2 the full bale switch, LS4 the up stop switch, LS5 the gate opening monitoring switch, DS the door switch, PS the pressure switch, SS the sequencing switch and R1A represents an added relay, with the remaining indicia being standard in the art. The standard circuitry found in a baler is changed by adding SS, a switch containing at least one pair of normally closed contacts, adding $R_s$, adding R1A to R1 to provide an additional set of contacts where R1 is a double pole/double throw relay, in effect creating a triple pole/double throw relay, and disconnecting the lead from the start button to the motor and connecting it to a set of normally open contacts in $R_s$ and connecting the motor to a set of normally open contacts in $R_s$. FIG. 2 shows the circuitry of the invention in the preferable embodiment as built into the baler circuitry in the factory where the R1 relay is a triple pole/double throw relay and the purpose of the sequencing switch is incorporated into LS3.

Figure 3A:
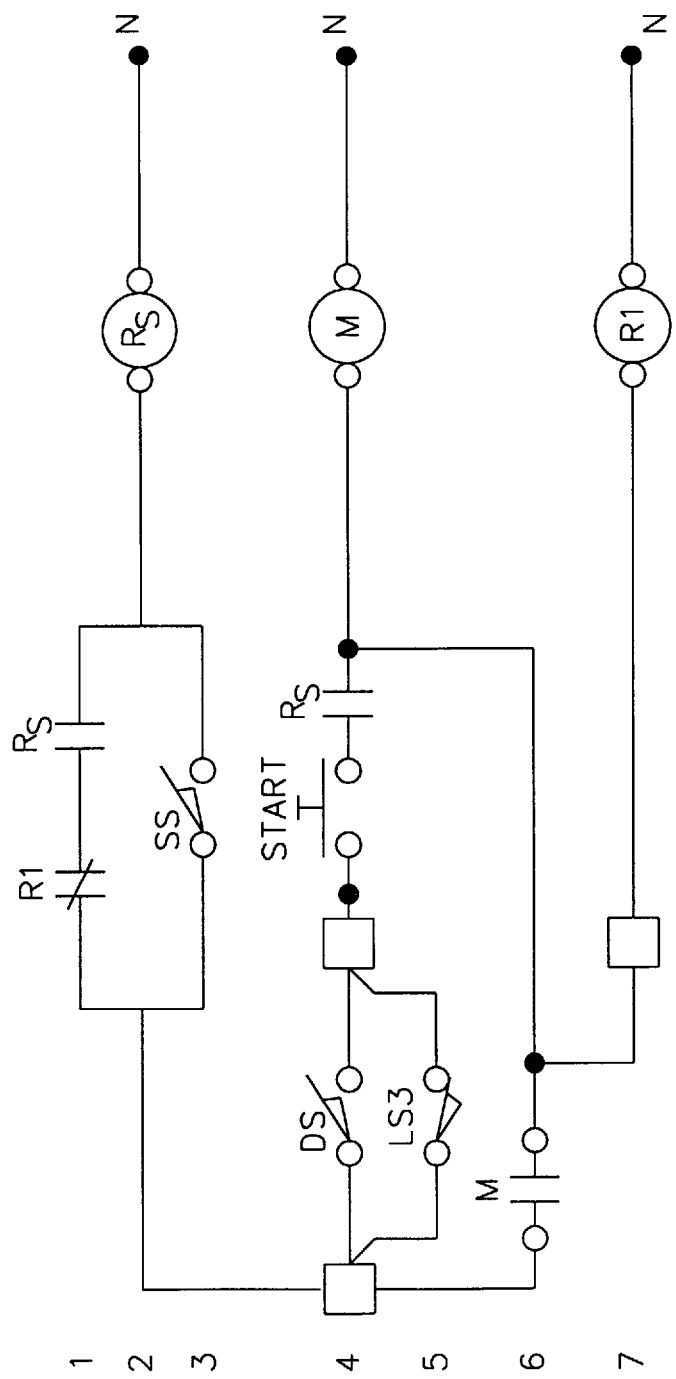
FIGS. 3a through 3e show schematic representations of the circuitry at successive points in the baler operational cycle.

The sequencing events for normal operation are shown in FIGS. 3a through 3e. FIG. 3a shows the condition of the line to neutral incorporating R1, and $R_s$, and the line to the motor incorporating $R_s$, when the lift gate is in the closed or down position after compaction and ascent of the ram. No electricity flows across $R_s$ on level 2 because the sequencing switch (LS3 in FIG. 2 and SS in FIG. 1) on level 3 and normally open $R_s$ contacts on level 1 are open to prevent a path to neutral. The de-energized $R_s$ relay maintains the normally open $R_s$ contacts on level 4 in the open state. Therefore, the motor will not operate and the ram remains stationary.

Figure 3B:
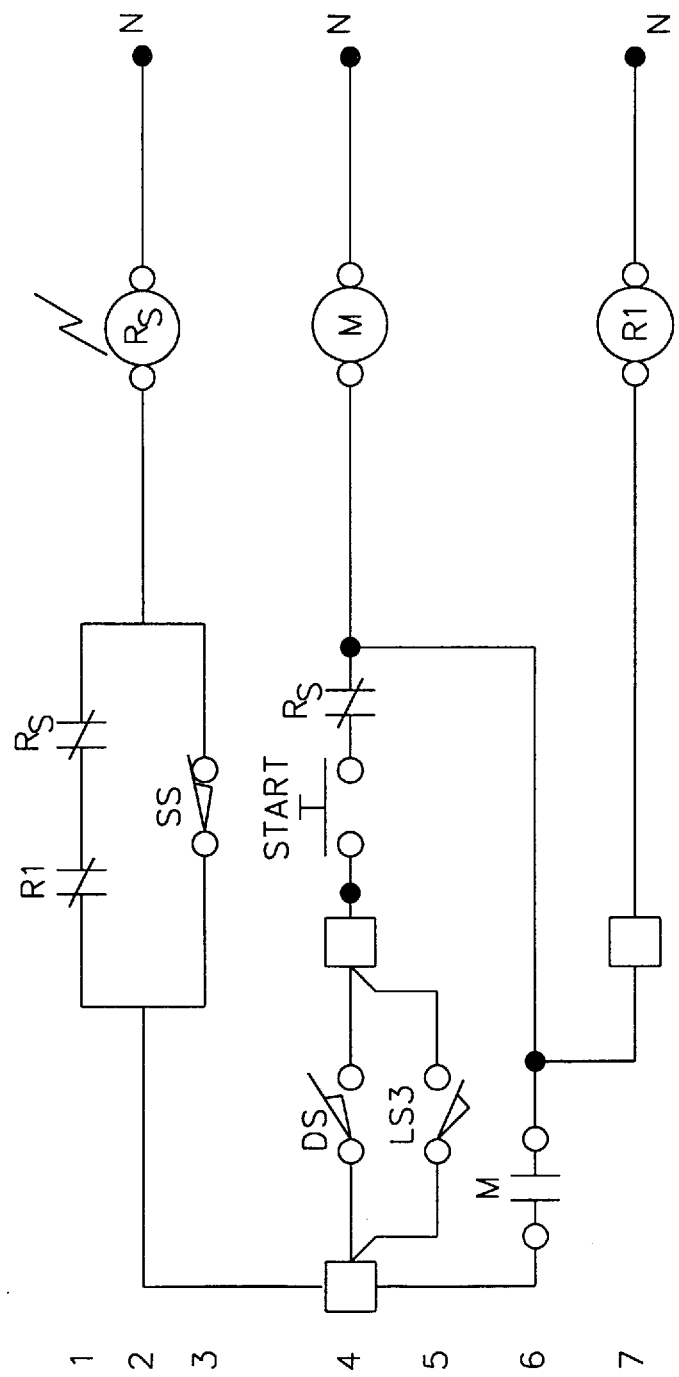

FIG. 3b shows the condition of the same lines when the feed gate is raised, either by the operator or the ram, and the path to neutral through $R_s$ is closed. The raised feed gate causes the sequencing switch (LS3 or SS) on level 3 to return to the normally closed position. The path to neutral energizes the $R_s$ relay and the normally open $R_s$ contacts on level 1 close, latching in the path to neutral. The energized $R_s$ relay closes the normally open $R_s$ contacts on level 4.

Figure 3C:
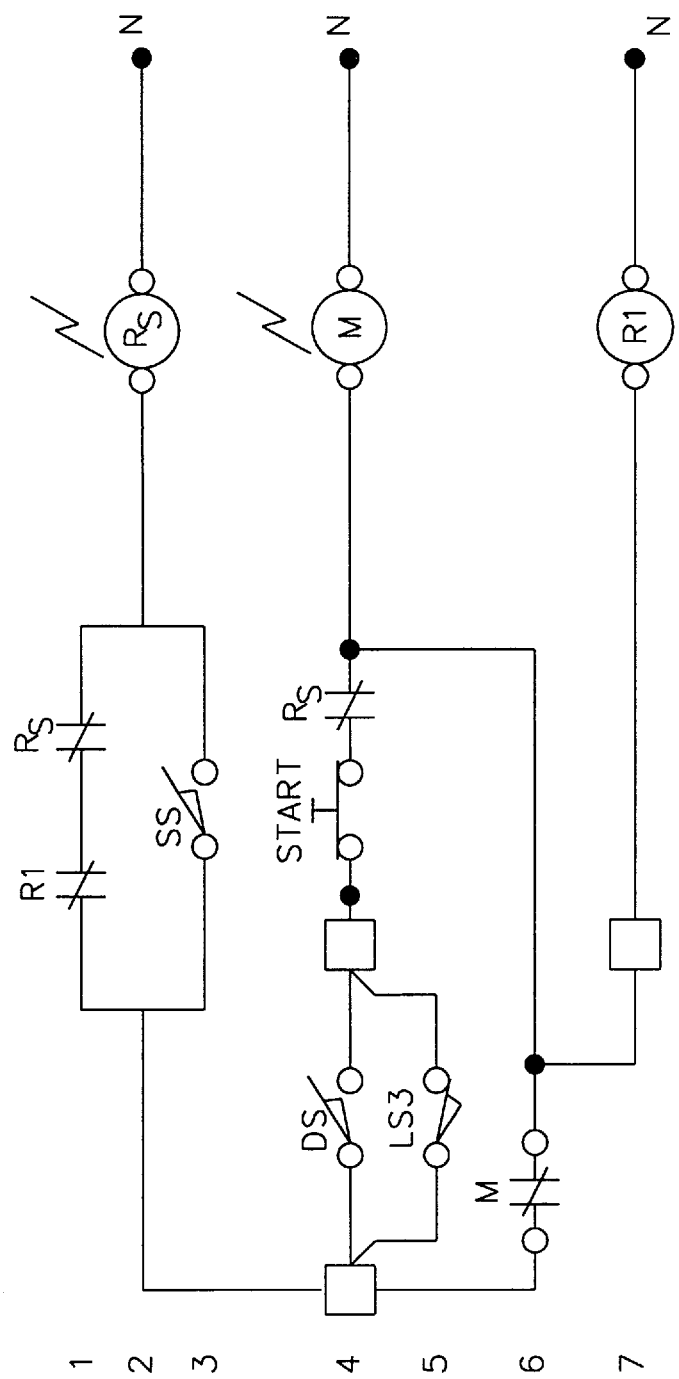

FIG. 3c shows the condition when the gate is closed and the motor in operation. The normally open LS3 contacts on level 5 are now closed and the normally open sequencing switch contacts (LS3 or SS) on level 3 are open. A path to neutral across the motor on level 4 can be made by depressing the START button on level 4, which closes the normally open motor contacts on level 6 and activates the motion controls to extend and retract the ram.

Figure 3D:
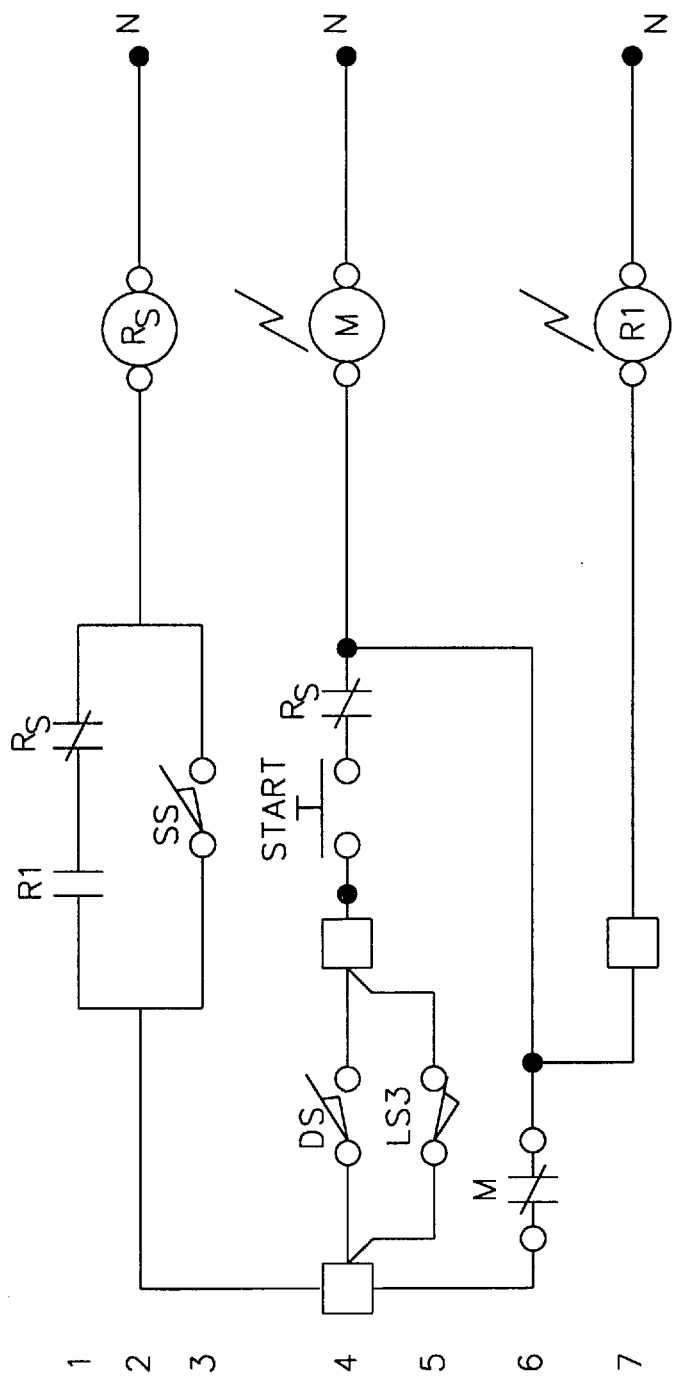

FIG. 3d shows the condition after the ram has fully descended to actuate pressure switch PS. The normally open contacts of LS2 are closed and R1 becomes energized. The normally closed R1 contacts in level 1 open to break the path to neutral.

Figure 3E:
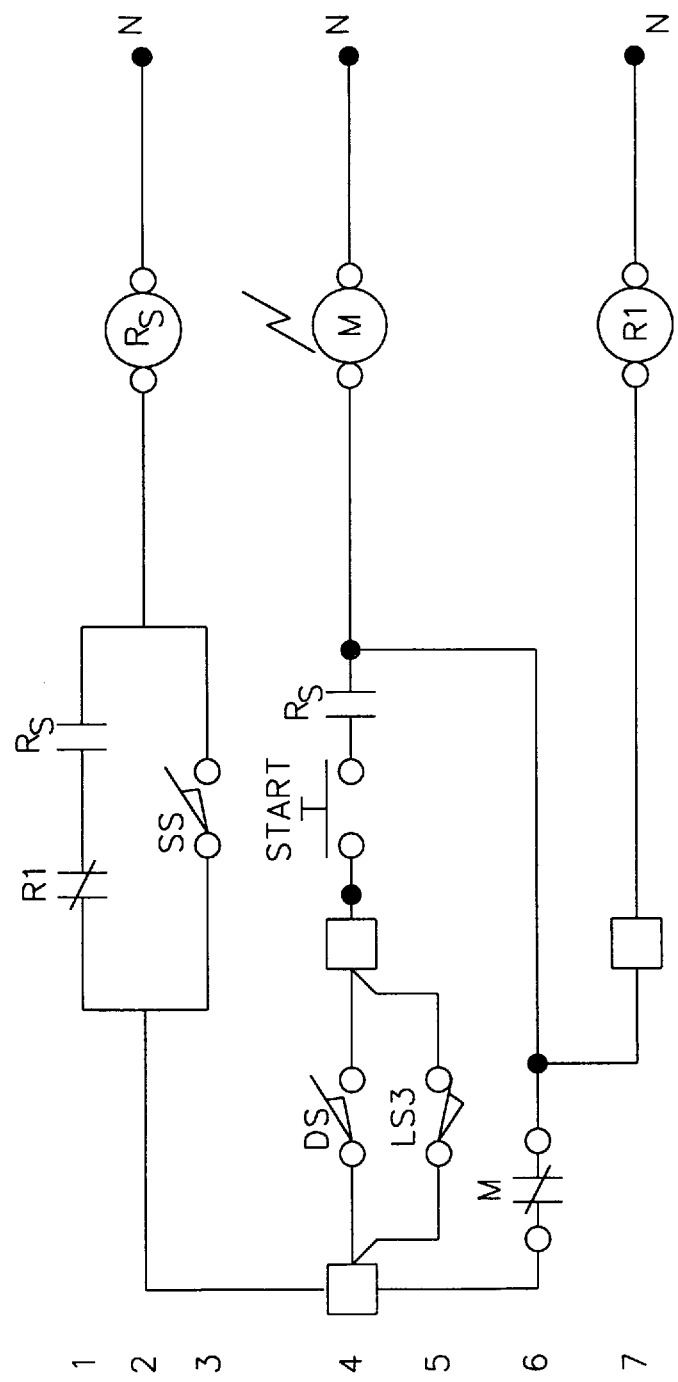

FIG. 3e shows the path across $R_s$ to neutral as now open and normally open $R_s$ contacts on level 4 open. The motor drives the ram up until stopped by LS4 or the operator. Once at rest, the system is again at the condition shown in FIG. 3a.

Thus, the circuitry must recognize that the gate limit switch has been cycled in order to operate successively the ram. Fixing LS3 or SS in a locked condition so that the gate can be kept in an open position during the compaction cycle will not allow the motor to operate the ram more than once unless the gate is lowered and opened again, thereby defeating the purpose behind rigging the gate switch. If the gate is in the closed position and the gate switch is fixed to register the gate as closed regardless of the actual position of the gate, opening the gate will not change the status of the gate switch such that the normally closed contacts of SS or LS3 remain in the open condition, and the overall condition of the circuit will remain as shown in 3a. Pressing the start button will have no effect as there is no path to neutral to allow operation of the ram motor. If the feed gate is in the open position when the gate switch is fixed to register the gate as being in the closed position, the contacts of SS or LS3 will be closed due to the opening of the gate, shifting the circuitry condition from 3a to 3b. Actuating the start button, as shown in 3c, will allow the ram to cycle once to create the condition shown in 3d, but with R1 energized, its contacts will open, and with SS or LS3 open, there is no path to neutral and the ram motor cannot be operated again unless the gate switch is cycled by releasing it from the fixed state.

It is understood that equivalents and substitutions to the components set forth above may be obvious to those skilled in the art, and thus the true scope and definition of the invention therefore is to be as set forth in the following claims.

I claim:

1. In a compaction baler comprising electrical circuitry to operate the baler, a loading chamber for insertion of crushable waste material into the baler, a safety feed gate to cover the loading chamber during a compaction step, a baler chamber to receive the waste material inserted into the loading chamber, and a compaction ram which passes through the loading chamber and into the baler chamber during a compaction step and which retracts from the baler chamber through the loading chamber during a retraction step to complete a compaction cycle, where the compaction baler further comprises means to sense the position of the safety feed gate relative to the loading chamber which precludes operation of the compaction ram unless the safety feed gate is in a closed position over the loading chamber, the improvement comprising electrical components in a circuit comprising:

means to sense completion of the compaction cycle, in circuit with the electrical circuitry to operate the baler, the compaction cycle being defined where the ram has passed through the loading chamber and into the baler chamber and then retracted through the loading chamber;

and means to recognize a sequence of changes in condition of the means to sense the position of the safety feed gate after the completion of the compaction cycle and means to preclude operation of the compaction ram unless said sequence of changes in condition of the means to sense the position of the safety feed gate has occurred after completion of the compaction cycle, in circuit with the electrical circuitry to operate the baler.

2. The device of claim 1, where said sequence recognized by said means to sense a sequence of changes in condition of the means to sense the position of the safety feed gate after the completion of the compaction cycle comprises a change from a first condition indicating that the feed gate is in the closed position through a second condition indicating that the feed gate is in the open position and back to the first condition.

3. The device of claim 2, where said means to recognize a sequence of changes in condition of the means to sense the position of the safety feed gate after the completion of the compaction cycle comprises a gate limit switch.

4. The device of claim 1, where said means to recognize a sequence of changes in condition of the means to sense the position of the safety feed gate after the completion of the compaction cycle comprises a gate limit switch.

* * * * *